(12) United States Patent
Fleck (10) Patent No.: US 6,874,448 B1
(45) Date of Patent: Apr. 5, 2005

(54) BICYCLE-MOUNTED RUNNING GUARD FOR DOGS

(76) Inventor: Claudette Fleck, 319 S. Regent St., Burlington, WA (US) 98233

( * ) Notice: Subject to any disclaimer, the term of this patent is extended or adjusted under 35 U.S.C. 154(b) by 0 days.

(21) Appl. No.: 10/419,288

(22) Filed: Apr. 18, 2003

Related U.S. Application Data (60) Provisional application No. 60/374,168, filed on Apr. 19, 2002.

(51) Int. Cl.$^7$ ............................................ A01K 15/02
(52) U.S. Cl. ....................................... 119/771; 280/203
(58) Field of Search ................................. 119/771, 769, 119/772, 777, 778, 779, 780; 280/203, 204, 202, 209, 222, 231, 273

(56) References Cited

U.S. PATENT DOCUMENTS

| | | | |
|---|---|---|---|
| 1,140,069 A | * 5/1915 | Rogers ........................ 280/203 |
| 1,388,387 A | * 8/1921 | Swan et al. .................. 280/203 |
| 1,417,822 A | * 5/1922 | Grew .......................... 280/203 |
| 4,134,364 A | 1/1979 | Boncela |
| 4,854,269 A | 8/1989 | Arntzen |
| 5,033,409 A | 7/1991 | Sabot |
| 5,215,037 A | 6/1993 | Allred |
| 5,248,158 A | * 9/1993 | Ellard ......................... 280/203 |
| 5,292,142 A | * 3/1994 | Vitarelli ...................... 280/203 |
| 5,305,710 A | * 4/1994 | Ward, Jr. ..................... 119/771 |
| 5,375,561 A | 12/1994 | Gundersen |
| 5,632,233 A | 5/1997 | Kovach |
| 5,842,445 A | 12/1998 | Barbour |
| 6,148,772 A | * 11/2000 | Keyek-Frannsen .......... 119/771 |
| 6,311,997 B1 | * 11/2001 | Lepley ....................... 280/203 |

* cited by examiner

*Primary Examiner*—Yvonne R. Abbott
(74) *Attorney, Agent, or Firm*—Todd N. Hathaway (57) ABSTRACT

A guard assembly that is mountable to a bicycle so as to maintain a dog in position alongside the bicycle when riding it. A U-shaped, rearwardly opening enclosure is defined by a lateral support extending from the bicycle frame and a plurality of rearwardly extending bars mounted to the outer end of the lateral support. An attachment for a short leash is provided on a middle portion of the lateral support, so that the dog will remain within the enclosure while walking or running alongside the bicycle. The rearwardly extending bars are spaced apart vertically so as to extend longitudinally past different parts of the dog's body. The upper and lower bars are spaced inwardly so as to be relatively close to the dog and therefore confine it against outward movement, while the middle bar is offset outwardly to accommodate motions of the dog's shoulders and hips. The upper bar also includes an upwardly bent portion that provides the dog with a visual reference that helps it maintain proper position within the enclosure. The invention thus allows a dog to be walked or run alongside of a bicycle without fear of the dog veering to the sides or crossing in front of or behind the bicycle and rider.

21 Claims, 7 Drawing Sheets

FIG. 14C ized guide bars. The guide bars may extend
BICYCLE-MOUNTED RUNNING GUARD FOR DOGS This application claims the benefit of Provisional Application No. 60/374,168, filed Apr. 19, 2002.

BACKGROUND a. Field of the Invention

The present relates generally to restraining devices for animals, and, more particularly, to a guard assembly for exercising a dog alongside a bicycle as the bicycle is ridden by an operator.

b. Related Art

Pet dogs, especially the larger breeds, require frequent exercise in order to remain fit and healthy. One convenient way of exercising a dog is to have the dog run alongside a bicycle as the bicycle is ridden by the dog's owner. This can be enjoyable and healthy for dog and owner alike, but can also be extremely dangerous.

For example, unless the dog is very well trained, there is tendency for the animal to pull ahead and run in front of the bicycle, which can cause the leash to be pulled across the front of the bicycle and cause the rider to crash. Conversely, some dogs may fall behind the bicycle so that the leash may become caught in the rear wheel or chain. Either situation presents the possibility of severe injury to both the rider and the dog.

Moreover, even when running directly alongside the bicycle the dog may pull one way or the other if startled or distracted, or if it stumbles or slips, as on a shoulder or obstruction for example. If unchecked this can cause the bicycle to topple over, or perhaps worse, cause the bicycle to swerve into the flow of traffic.

A number of devices have been used or proposed in the prior art for attaching a dog to a bicycle or similar vehicle, including those shown in the following patents: U.S. Pat. No. 5,842,445 (Barbour), U.S. Pat. No. 5,632,233 (Kovach), U.S. Pat. No. 5,215,037 (Allred), U.S. Pat. No. 5,375,561 (Gundersen), U.S. Pat. No. 5,033,409 (Sabot), U.S. Pat. No. 4,854,269 (Arntzen) and U.S. Pat. No. 4,134,364 (Boncela). However, none of these devices satisfactorily addresses the problem of maintaining the dog in a proper position alongside the bicycle while at the same time preventing it from pulling to the side, so that the hazards described above have heretofore remained unresolved.

Accordingly, there exists a need for an apparatus for attaching a dog to a bicycle so as to safely exercise the dog as the bicycle is ridden. Furthermore, there exists a need for such an apparatus that maintains the dog in the proper position alongside the bicycle and prevents the dog from either pulling ahead of or falling behind the bicycle. Still further, there exists a need for such an apparatus that prevents the dog from pulling to one side or the other as it is running alongside the bicycle. Still further, there exists a need for such an apparatus that ergonomically matches the body of a running dog so as to properly constrain the animal without impairing its movements or risking injury. Still further, there exists a need for such an apparatus that is lightweight so as to avoid unduly encumbering the bicycle, and that is easily dismounted when not in use. Still further, there exists a need for such an apparatus that is inexpensive to manufacture, and that is durable and long lasting in use.

SUMMARY OF THE INVENTION

The present invention has solved the problems cited above, and is a guard assembly that is mountable to a bicycle so as to maintain a dog in position alongside the bicycle while riding.

Broadly, the guard assembly comprises at least one rigid, laterally-extending support member having inner and outer ends, at least one rigid, longitudinally-extending bar member mounted to the outer end of the support member and extending rearwardly therefrom, and means for mounting the inner end of the laterally-extending support member to a bicycle so that the bicycle extends in a direction generally parallel to the bar member, so that in combination the support member, bar member and bicycle define a U-shaped, rearwardly-opening enclosure for confining a dog alongside the bicycle as the bicycle is ridden.

The at least one bar member may comprise a plurality of vertically spaced guide bars. The guide bars may extend generally parallel to one another, rearwardly from the outer end of the lateral support member. A first guide bar may be positioned so as to extend generally level with and parallel to an upper body portion of the dog, and a second guide bar member may be positioned to extend generally alongside the legs of the dog. A third guide bar member may be positioned to extend generally alongside the head and back of the dog.

The first guide bar member may be offset outwardly from the upper and lower guide bar members so as to accommodate motion of the shoulders and hips as the dog runs. The upper bar member may comprise an upwardly curved portion for accommodating vertical motion of the shoulder and for presenting a visual reference to the dog.

The lateral support member may comprise a transversely extending support bar, and means may be provided for attaching a short leash from the dog to a middle portion of the support bar. The means for mounting the support bar to the bicycle may comprise means for mounting the inner end of the support bar to an angled down tube of the frame of the bicycle. The lateral support member may include a recessed portion near the inner end thereof to provide clearance for the pedal of the bicycle and foot and lower leg of the rider.

The means for mounting the inner end of the support bar to the down tube of the bicycle frame may comprise a clamp member for selectively engaging the down tube. The height of the guard assembly may be adjusted by selectively mounting the clamp at higher or lower positions along the angled down tube.

These and other features and advantages of the present invention will be apparent from a reading of the following detailed description with reference to the accompanying drawings.

DETAILED DESCRIPTION

Figure 1:
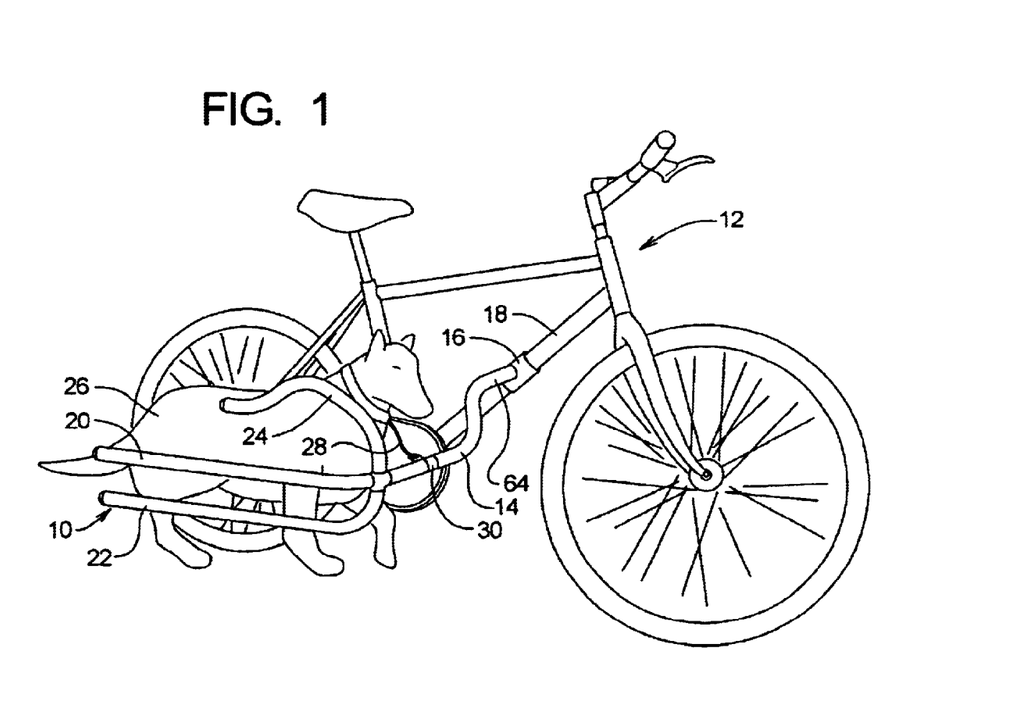
FIG. 1 is a perspective view of a running guard assembly in accordance with the present invention, showing the manner in which this is mounted to a bicycle so as to confine the dog to a proper location alongside the bicycle.

FIG. 1 shows a running guard 10 in accordance with the present invention, mounted to a conventional bicycle 12. As can be seen, the guard assembly includes a lateral support member 14 that mounts to an adaptor 16 on the main down tube 18 of the bicycle frame. Longitudinal, rearwardly-extending guide bars 20, 22 and 24 are mounted to the outer end of the lateral support member, and in combination with the bicycle and the support member define a U-shaped confinement area for the dog 26. The confinement area opens to the rear, and the dog is secured at the front of the confinement area by a short leash 28 that is attached to a clip 30 on the lateral support member.

In this manner the dog is held securely in the proper position alongside the rider, and can move neither ahead of nor behind the bicycle. Lateral movement and pulling, in turn, is restricted by the bicycle on one hand and the longitudinal bars 20, 22 and 24 on the other. Not only does this eliminate the safety problems described above, this position corresponds to the correct "heel" position in which dogs are trained to walk alongside their owners, both making it easier for the dog to adapt to use of the assembly and also reinforcing its earlier training. The guard assembly may be used with the dog on a permanent basis, or in some instances the dog will become so well trained after a period of use that it will remain in the proper position of its own accord and the guard can be safely removed, assuming that other conditions permit.

Figure 2:
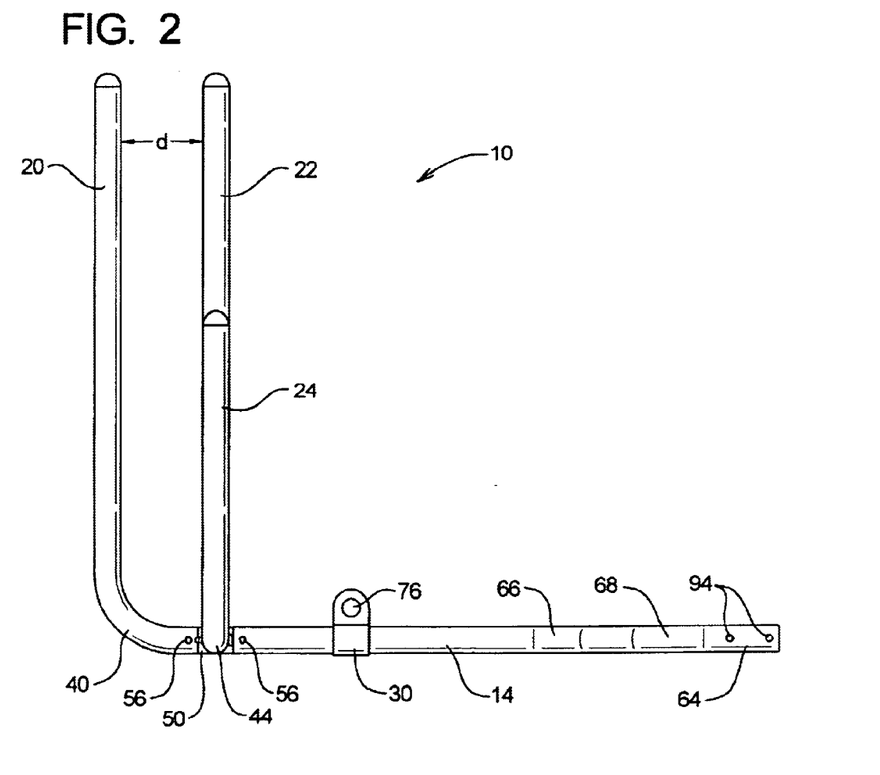
FIG. 2 is a top, plan view of the running guard assembly of FIG. 1, showing the arrangement of the longitudinal guide bars of the assembly in greater detail.

The guide bars 20, 22, 24 of the assembly extend in rearward direction and generally parallel to one another. As can be seen in FIG. 2, the middle or primary guide bar 20 is offset outwardly from the upper and lower guide bars 24, 22 by a spaced distance "d". The primary guide bar is located generally level with the dog's body, and its outward offset accommodates the bulk of the body and also the motion of the shoulders and hips as the dog runs. The inwardly spaced locations of the upper and lower guide bars 24, 22, in turn, position these more closely adjacent the dog's head and feet, so as to discourage the dog from pulling outwardly.

Figure 4:
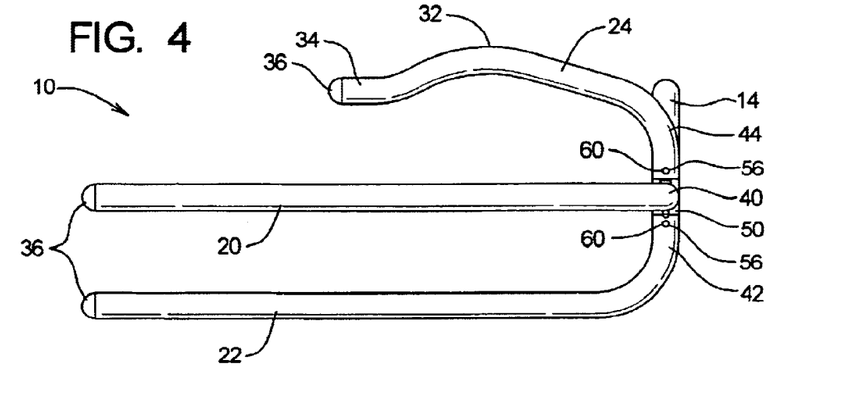
FIG. 4 is a first side, elevational view of the guard assembly of FIGS. 2–3, looking from the outside of the assembly towards the location of the bicycle, showing the configuration and vertical spacing of the longitudinal guide bars.
Figure 5:
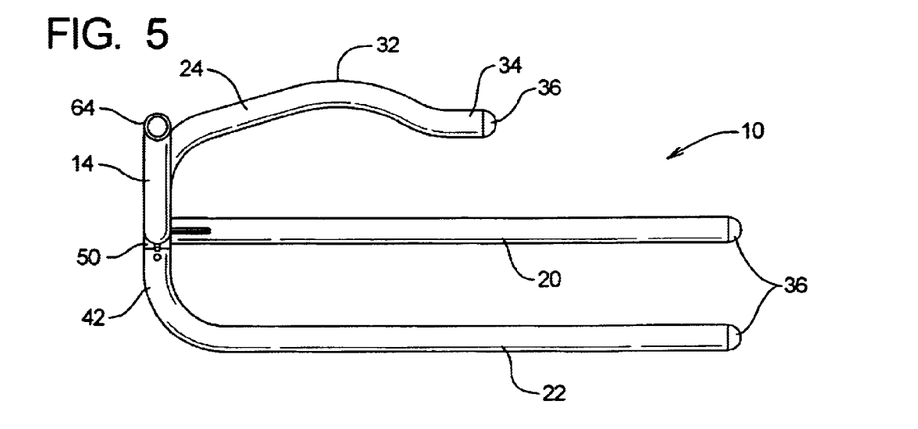
FIG. 5 is a second side, elevational view of the guard assembly of FIGS. 2–4, looking towards the inside of the assembly from the direction of the bicycle, showing the relationship of the lateral support member to the longitudinal bar members in greater detail.

As can be seen in FIG. 1 and also in FIGS. 4–5, the primary guide bar 20 and lower guide bar 22 are suitably formed as straight, elongate members, and preferably have sufficient length to extend rearwardly beyond the furthest extent of the dog's legs. This prevents the legs from catching on the ends of the bars as the dog runs, and if a leg does contact the bar it will simply slide along the smooth inside surface of the bar without injuring the animal or causing it to stumble.

The upper guide bar 24 is located above the level of the legs and is therefore somewhat shorter, and includes an upwardly bowed center section 32, which accommodates the motion of the dog's shoulder and also places the bar more on level with the dog's eye so as to provide a prominent visual reference and deterrent against outward pulling. The rearward end 34 of the bar, in turn, extends downwardly and then horizontally to generally follow the curve of the dog's back, and terminates at a location proximate the lengthwise midpoint of the body.

The guard assembly is preferably constructed of lightweight tubing so that the bicycle remains unencumbered and easy to ride. Thin-wall, high-strength aluminum alloy tubing is eminently suitable for this purpose, however, it will be understood that other suitable materials may be employed in some embodiments, such as PVC pipe or other molded plastic materials, for example. The ends of the bars are preferably enclosed by protective caps or plugs 36, both for the safety of the animal and to improve the aesthetics and durability of the assembly.

Figure 3:
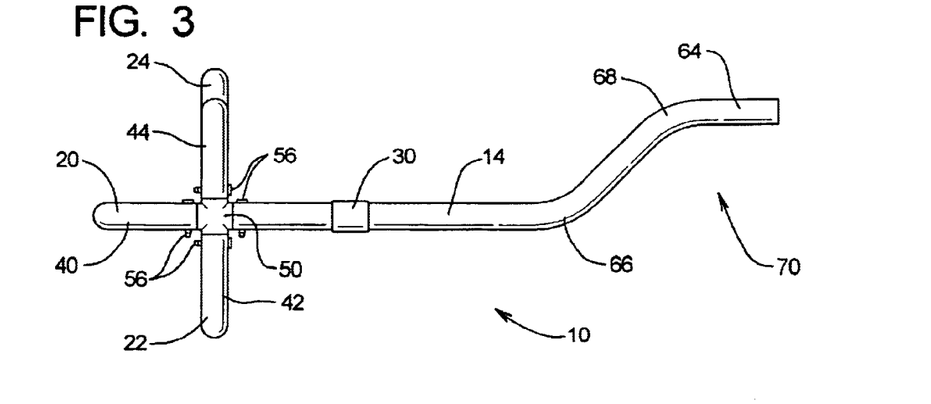
FIG. 3 is a front, elevational view of the guard assembly of FIG. 2, showing the manner in which the longitudinal guide bars are joined and mounted to the lateral support member in greater detail.

The forward ends of the guide bars 20, 22, 24 bend inwardly at approximately 90° angles, so as to form converging legs 40, 42, and 44 that meet at and are joined by a 4-way connector 50 (see FIG. 3). The forward corners of the bars are smoothly radiused so that the bars glance off of rather than catching on or striking squarely against passing objects; in particular, the forward corner of the lower bar member is contoured to simply skid along the ground and avoid catching obstructions should the assembly accidentally touch down during cornering.

Figure 7A:
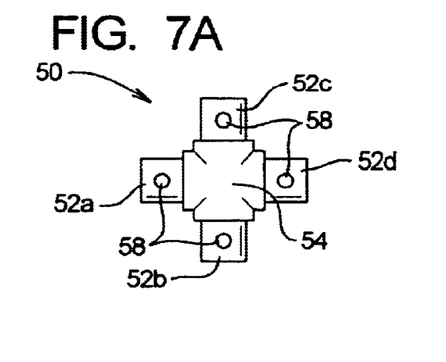
FIG. 7A is a front, elevational view of a 4-way connector that mounts to and interconnects the lateral support member and the three longitudinal guide bars of the guard assembly of FIGS. 2–5.
Figure 7B:
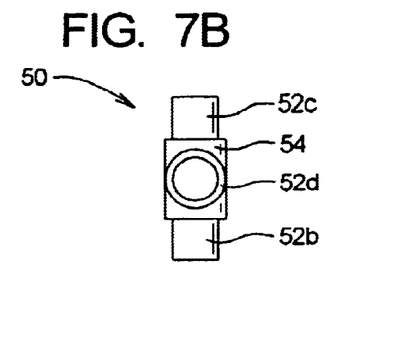
FIG. 7B is a side, elevational view of the 4-way connector of FIG. 7A.

As can be seen in FIG. 3 and also in FIGS. 7A–7B, the 4-way connector piece 50 is a generally cruciform member, with four tubular stubs 52a, 52b, 52c, 52d projecting at right angles from the central hub 54. Each of the connector stubs has an outside diameter just slightly smaller than the inside diameter of the corresponding bar of the guard assembly, so that the end of the bar slips over the stub in a close-fitting engagement therewith. Locking pins 56 or bolts or other fasteners are passed through corresponding bores 58, 60 in the stubs 52 and in the ends of the guard rails 20, 22, 24 to secure the members together. Thus mounted, the close interfit with the connector stubs and the bars eliminates any "wobble" and forms a rigid, sturdy structure. It will be understood, however, that some or all of the bars would be welded or otherwise fixedly mounted to the lateral support member, rather than using a detachable connector fitting as shown.

The outer end of the tubular support member 14 fits over and engages the fourth connector stub 52d in the same manner. As can be seen in FIG. 3, the support member 14 extends horizontally for most of its length, however, its inward end section 64 is offset upwardly by first and second bends 66, 68. This serves to bring the end of the support member level with the down tube of the bicycle frame at the desired longitudinal position, and also forms a recess 70 at the inner end of the bar that provides clearance for the pedal and the rider's foot/leg.

Figure 6A:
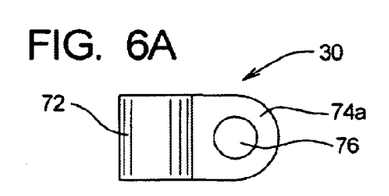
FIG. 6A is top, plan view of a leash clip that mounts to the lateral support member of the guard assembly of FIGS. 2–5 for attachment of the dog's leash thereto.
Figure 6B:
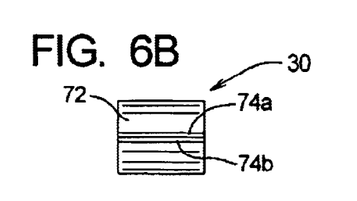
FIG. 6B is a rear, elevational view of the leash clip of FIG. 6A.
Figure 6C:
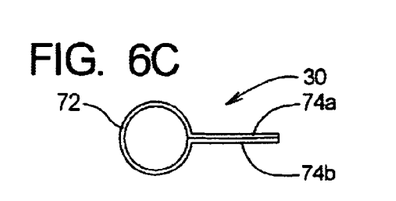
FIG. 6C is a side, elevational view of the leash clip of FIGS. 6A–6B, showing the manner in which the clip surrounds and mounts to the lateral support member.

As was noted above, the leash clip 30 (or other attachment for the dog's leash) is mounted to the lateral support member 14, in the area between the offset inner end 64 and the guide bars 22, 24. As is shown in FIGS. 6A–6C, the clip 30 is suitably formed of flat metal stock, which is bent to provide a cylindrical sleeve portion 72 for fitting over and engaging the tubular support member 14 and first and second overlapping flange portions 74a, 74b that project rearwardly from the sleeve portion. A hole 76 is formed through the overlapping flange portions to permit attachment of the leash 28, as is shown in FIG. 1.

Figure 8:
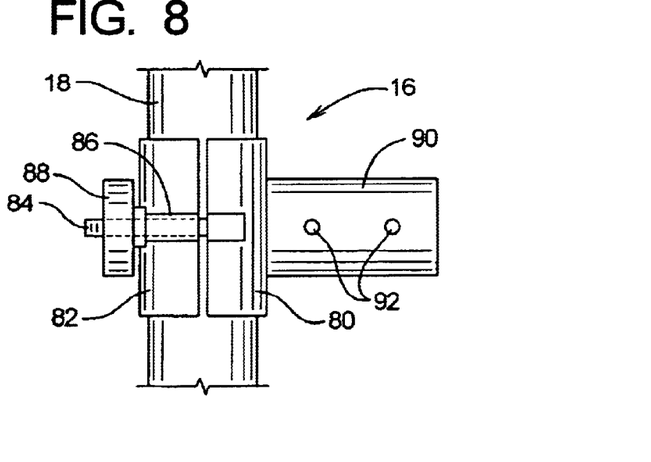
FIG. 8 is a top, plan view of an adaptor clamp that mounts the main down tube of the bicycle frame for detachably mounting the lateral support member of the guard assembly of FIGS. 2–5 thereto.

As is also shown in FIG. 1, the inner end 64 of the lateral support member attaches to the adaptor 16 that is mounted on the bicycle frame. As can be seen in FIG. 8, the adaptor includes first and second hemicylindrical clamp members 80, 82 that fit over and engage the main down tube 18 of the frame. The concave inner surfaces of the clamp members correspond to the generally exterior of the down tube 18, and are preferably provided with a layer of resilient foam or other cushioning material (not shown) for preventing damage to the frame tube and/or paintwork. Different sizes and shapes of clamp members may be provided as necessary to fit different sizes and shapes of frame tubing.

Upper and lower threaded studs 84 (only the upper stud being visible in FIG. 8) are mounted to and project from the first clamp member 80, and pass through corresponding bores in transverse sleeve portions 86 on the opposite clamp member 82. A large diameter knob 88 is threaded onto the end of each stud, so that the clamp members can be securely pressed against the frame tube by simply tightening the knobs. Furthermore, the height of the guard assembly is easily adjusted to accommodate larger or smaller dogs, by simply sliding the clamp members to higher or lower locations along the angled down tube and then tightening the knobs 88. This provides a convenient, secure and easily adjustable structure for mounting the adaptor to the frame tube, but it will be understood that other suitable forms of clamps or mounting structures may be employed in other embodiments.

A tubular mounting stub 90 is mounted to and extends laterally from the first clamp member 80, and is provided with first and second cross bores 92. Similar to the 4-way connector described above, mounting the stub 90 is sized to fit closely within the interior of the lateral support member 14 at its inner end 64. Locking pins or bolts are then passed through the cross bores 92 and corresponding bores 94 in the end of the lateral support member so as to lock the support member in place. As before, the tight interfit formed between the support member and the tubular mounting stub 90 ensures that the guard assembly is held securely and rigidly in place. Furthermore, the assembly is easily detached and removed when not in use, by simply removing the locking pins from bores 92, 94 and sliding the lateral support member off of the mounting stub.

Figure 9:
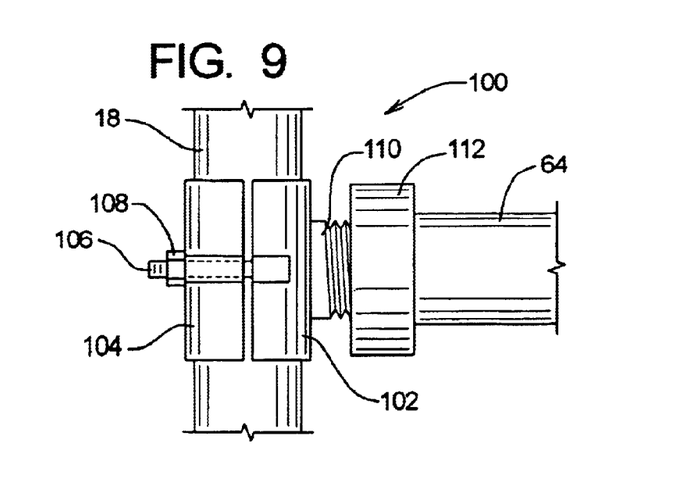
FIG. 9 is a top, plan view of a second form of adaptor clamp that mounts to the main down tube of the bicycle frame for mounting the guard assembly thereto, this being provided with a threaded lug that is received in an internally threaded knob on the end of the lateral support member of the guard assembly.

An adapter assembly 100 in accordance with another embodiment of the present invention is shown in FIG. 9. As can be seen, this is somewhat similar to the structure described above, in that there are first and second clamp halves 102, 104 that fit around and engage the angled down tube 18 of the bicycle frame, and which are secured together by threaded studs 106 and bolts 108. In this embodiment, however, a large-diameter threaded lug 110 extends laterally from the first clamp member 102, in place of the mounting stud 90 shown in FIG. 8. The threaded lug is received in and engaged by a large-diameter, internally threaded knob 112 that is mounted for coaxial rotation on the end 64 of the lower support member 14 (see also FIG. 9). Thus, the guard assembly is easily mounted to the adaptor 100 by simply threading the knob 112 onto lug 110 and tightening; similarly, the assembly can be removed by simply loosening knob 112 and pulling it off of the lug. An additional advantage of this configuration is that it allows for any wear or "stop" that might develop to be taken up by simply further tightening the mounting knob 112.

Figure 10:
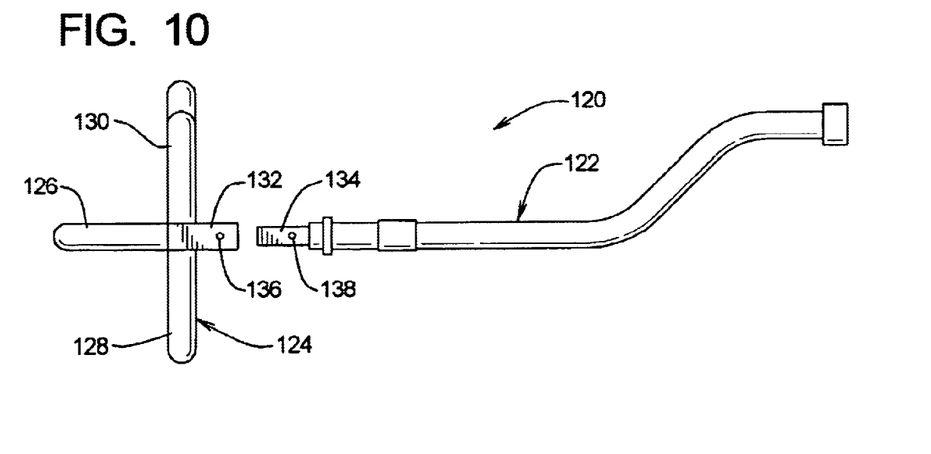
FIG. 10 is a front elevational view of a guard assembly in accordance with another embodiment of the present invention, in which the connection between the lateral support member and longitudinal bar unit is formed by a square stub that is received in a cooperating sleeve to which the longitudinal bars are welded, in place of the 4-way connector that is shown in FIGS. 7A–7B.
Figure 11:
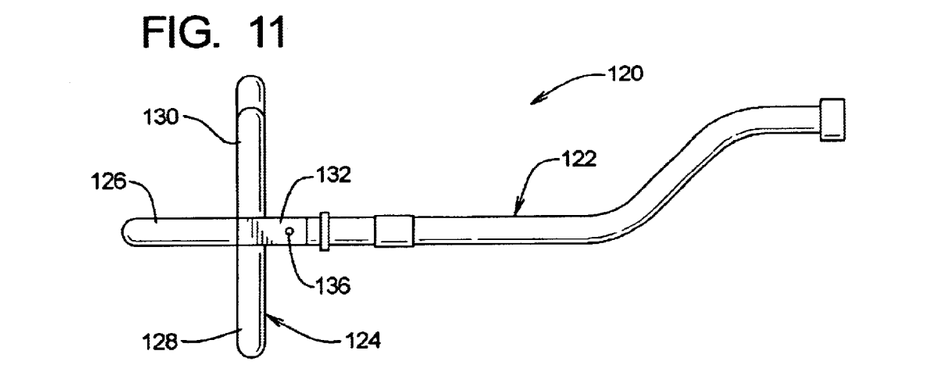
FIG. 11 is a front elevational view of guard assembly FIG. 10, showing the lateral support member and longitudinal bar unit connected by means of the square cross-section stub and sleeve.

FIGS. 10–11 show a guard assembly 120 in accordance with another embodiment of the present invention. Assembly 120 is generally similar to that described above in overall configuration, having a longitudinal support 122 that extends from the bicycle frame and a bar unit 124 that includes the longitudinally extending bars 126, 128, 130. In place of the 4-way connector described above, the bars are welded to the sides and end of a square cross-section sleeve 132. A corresponding square cross section stub 134 is mounted at the end of the longitudinal support member, and is sized to be received in sleeve 132 in close-fitting, sliding engagement therewith. A pin or bolt (not shown) is passed through cooperating, co aligned bores 136, 138 to lock the pieces together when assembled as shown in FIG. 11.

Figure 12:
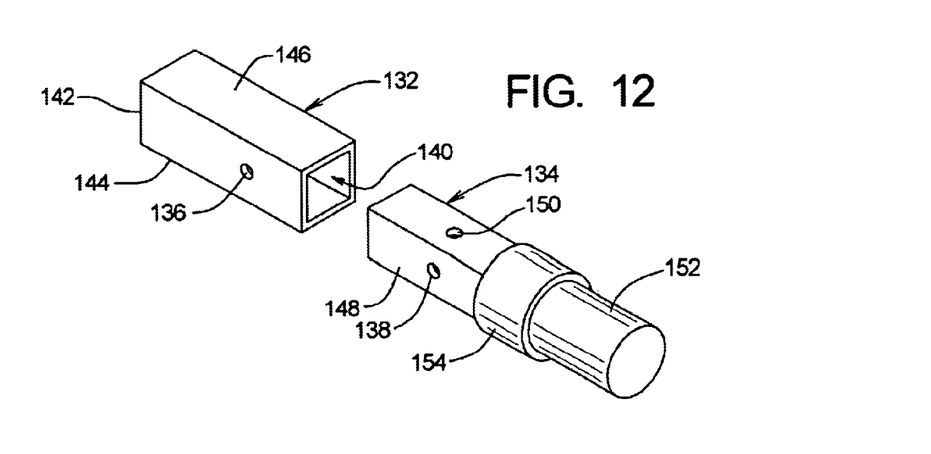
FIG. 12 is a perspective view of the square cross section stub and sleeve member of the guard assembly of FIGS. 10–11.

FIG. 12 shows the sleeve 132 and end stub 134 in greater detail, prior to welding to the bars and support. As can be seen, the sleeve 132 is suitably formed from a short length of square cross-section tubing having a hollow interior 140. The end 142 and lower and upper walls 144, 146 of the sleeves provide surfaces to which the square-cut ends of the longitudinal bars can easily be mounted and welded, facilitating rapid and efficient manufacture.

The stub member 134, in turn, includes a short, square cross section shaft 148 that is sized to slide into and fit tightly within the interior 140 of sleeve 132. The square-sided configuration of the shaft and sleeve is strong, economical to manufacture, and provides additional advantages that will be described below, however, it will be understood that any other suitable shape may be used, such as cross-sections having other geometric forms, splines and so on. The engagement thus formed between the external surfaces of the stub shaft and internal surfaces of the sleeve supports the bar unit against both horizontal and vertical forces.

In addition to the bore 138 that has been noted above, the square shaft of the end stub 134 includes a second transverse bore 150 extending at right angles to the first, the use of which will be described in greater detail below.

As can be seen in FIG. 12, the square shaft 148 forms one end of the stub member 134, the other end being formed by a short cylindrical shaft 152. The square and round shafts are separated by an annular shoulder 154 about the middle of the member. The cylindrical shaft 152 is sized to slide into and fit closely within the end of the tubing of which the lateral support member is formed. The shoulder 154, being somewhat larger in diameter than shaft 152, butts up against the end of the tubing to form a stop that prevents over-insertion of the stub member, and also forms a tight-fitting seam at which the shoulder and tubing can be quickly and easily welded together. The stub member thus facilitates rapid and economical manufacture, as well as forming a sturdy and durable connection. In the illustrated embodiment the tubular members that form the lateral support and longitudinal bars are preferably formed of lightweight aluminum alloy, and the sleeve and end stub members are therefore preferably formed of an aluminum alloy that allows welding to the tubing in a single pass.

Figure 13:
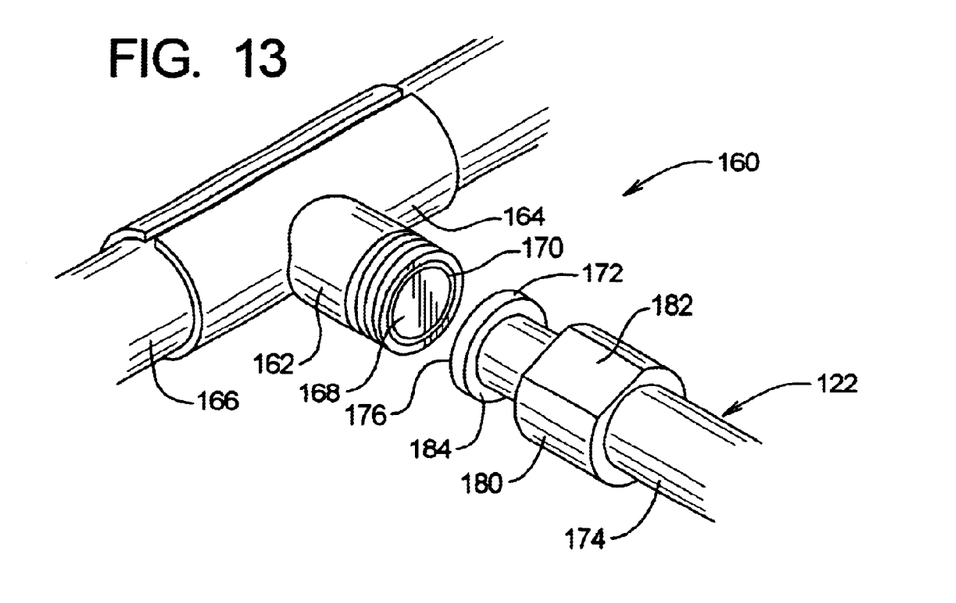
FIG. 13 is a perspective view of the adaptor clamp and internally threaded knob by which the lateral support member of the guard assembly of FIGS. 10–11 is mounted to the frame of a bicycle.

FIG. 13 shows the frame-mount adaptor 160 of the guard assembly of FIGS. 10–11, this being somewhat similar to the adaptor assembly that is shown in FIG. 9. As can be seen, this includes a large-diameter (e.g., 1½") externally threaded lug 162 that extends laterally from one of the clamp members 164 that engage the frame tube 166 of the bicycle. The outer end of the threaded lug is provided with a broad, flat mating surface 168 having a recessed circumferential rubber O-ring 170. A disc member 172 is mounted on the inboard end of the tubular member 174 of support 122, and includes a corresponding broad, flat mating surface 176 that abuts the mating surface 168 on the mounting stub in load-bearing engagement. A large-diameter internally-threaded knob 180, similar to a large sleeve nut, is mounted around the support tube 174 so as to receive and threadingly engage the mounting stub 162, with flats 182 being provided on the knob to aid in tightening. As this is done, the knob engages the outer shoulder 184 on disc 172 so as to force the mating surfaces 168, 176 into firm engagement. Simultaneously, the resilient O-ring 170 forms a frictional engagement between the mating surfaces that prevents the lateral support from rotating relative to the adaptor and bicycle frame.

Figure 14A:
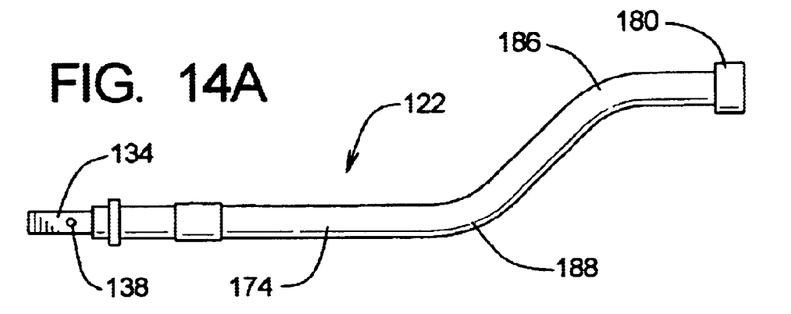
FIGS. 14A–14C are front, elevational views of the lateral support member of the guard assembly of FIGS. 10–11, showing the support member rotated by quarter turns to illustrate the manner in which this cooperates with the adapter attachment on the bicycle frame to permit the height of the assembly to be adjusted, depending on the height of the dog with which the assembly is used.
Figure 14B:
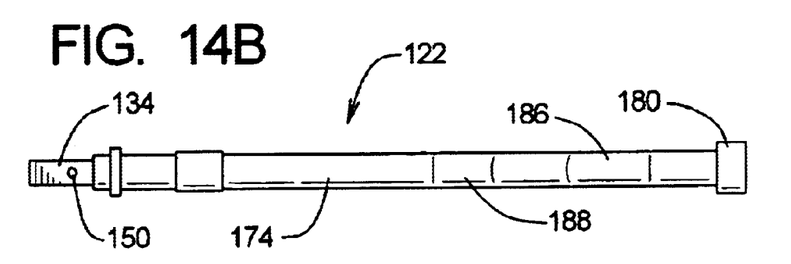
Figure 14C:
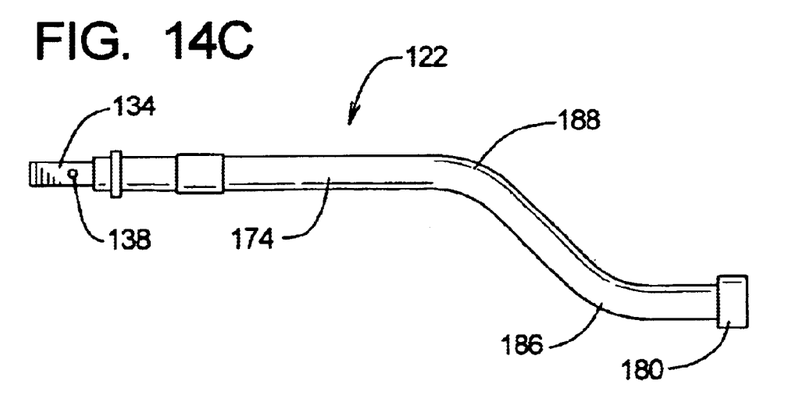

FIGS. 14A–14C illustrate the manner in which the transverse support member of the guard assembly of FIGS. 10–11 can be adjusted to support the bar unit at low, medium and high levels, so as to be able to tailor the height of the assembly to that of the dog with which it is used.

FIG. 14A shows the lateral support 122 in the "low" position, in which the first and second bends 186, 188 of the transverse tubular member 174 are aligned in a vertical plane so that the outer end of the support is positioned below the frame attachment at 180. In this position, the square mounting stub 134 is oriented so that the bar unit is supported horizontally thereon, the latter being secured to the lateral support by passing a pin or bolt through bore 138 in the manner previously described.

To raise the assembly to the next level, the bar unit is removed and mounting knob 180 is loosened. The support tube 174 is then rotated one-quarter turn (90°), as shown in FIG. 14B. In this position, the bends 186, 188 lie in the horizontal plane so that the end of the support is at the same level as the frame adaptor The square-sided mounting stub 134 is again oriented to hold the bar unit in a level, horizontal orientation, the pin or bolt in this instance being passed through the second, transverse bore 150 described above.

Finally, to raise the assembly to its highest position, the tubular level 174 is rotated another one-quarter turn as shown in FIG. 14C, so as to be inverted from the orientation of FIG. 14A. The bends 186, 188 of the tubular member 174 are therefore again in a vertical plane, with the outer end of the support member now being positioned above the frame attachment. In this position, the first bore 138 in stub 134 is again used for the mounting pin/bolt.

The square mounting stub at one end of the lateral support and the cylindrical adaptor at the other thus cooperate to allow convenient adjustment of the assembly between low, medium and high positions without having to move the clamp and adaptor up or down the frame tube of the bicycle. This allows convenient adjustment while still keeping the inboard end of the lateral support member clear of both the pedals and the front wheel of the bicycle (i.e., when turning).

It is to be recognized that various alterations, modifications, and/or additions may be introduced into the constructions and arrangements of parts described above without departing from the spirit or ambit of the present invention as defined by the appended claims.

What is claimed is:

1. A guard assembly for mounting to a bicycle so as to maintain a dog in position alongside of said bicycle while riding, comprising:

at least one rigid, laterally extending support member having inner and outer ends;

at least one rigid, longitudinally extending bar member mounted to said outer end of said support member and extending rearwardly therefrom;

means for mounting said inner end of said laterally extending said support member to a bicycle so that said bar member on said outer end of said support member extends generally parallel to a longitudinal axis of said bicycle; and so that in combination said support member, bar member and bicycle define a U-shaped, rearwardly-opening enclosure for confining a dog alongside said bicycle as said bicycle is ridden by a rider.

2. The guard assembly of claim 1, wherein said at least one bar member comprises:

a plurality of vertically spaced guide bars.

3. The guard assembly of claim 2, wherein said plurality of said guide bars extend generally parallel to one another, rearwardly from said outer end of said lateral support member.

4. The guard assembly of claim 3, wherein said plurality of vertically spaced guide bars comprises:

a first guide bar positioned so as to extend generally level and parallel to the upper body portion of a dog; and a second guide bar positioned so as to extend generally alongside the legs of a dog.

5. The guard assembly of claim 4, wherein said plurality of vertically spaced guide bars further comprises:

a third guide bar positioned so as to extend generally alongside the head and back of a dog.

6. The guard assembly of claim 5, wherein said first guide bar is offset outwardly from said third and second guide bars so as to accommodate motion of the shoulders and hips of a dog when running.

7. The guard assembly of claim 6, wherein said third guide bar comprises:

an upwardly curved portion for accommodating vertical motion of a shoulder of a dog and for presenting a visual reference to a dog when running within said enclosure.

8. The guard assembly of claim 1, wherein said laterally extending support member comprises:
   a transversely extending support bar.
9. The guard assembly of claim 8, further comprising:
   means for attaching a short leash for a dog to a middle portion of said support bar.
10. The guard assembly of claim 9, wherein said means for mounting said laterally extending support member to a bicycle comprises:
    means for mounting said inner end of said support bar to an angled down tube of a frame of a bicycle.
11. The guard assembly of claim 10, wherein said support bar comprises:
    a recessed portion formed near said inner end of said support bar so as to provide clearance for a pedal of a bicycle and a lower leg of a rider thereof.
12. The guard assembly of claim 11, wherein said means for mounting said inner end of said support bar to an angled down tube of a frame of a bicycle comprises:
    a clamp assembly for selectively engaging a down tube of a bicycle frame; and
    means for detachably mounting said inner end of said support bar to said clamp assembly.
13. The guard assembly of claim 11, wherein said means for detachably mounting said lateral support bar to said clamp assembly comprises:
    an externally threaded stub mounted to and extending laterally from said clamp assembly; and
    an internally threaded knob mounted on said inner end on said lateral support bar for threadingly engaging said mounting stub on said clamp assembly.
14. A guard assembly for mounting to a bicycle so as to maintain a dog in position alongside of said bicycle while riding, comprising:
    at least one rigid, laterally extending support member having inner and outer ends;
    at least one rigid, longitudinally extending bar member mounted to said outer end of said support member and extending rearwardly therefrom, said at least one bar member comprising a plurality of vertically spaced guide bars;
    means for mounting said inner end of said laterally extending said support member to a bicycle so that said guide bars on said outer end of said support member extend generally parallel to a longitudinal axis of said bicycle; and
    so that in combination said support member, guide bars and bicycle define a U-shaped, rearwardly-opening enclosure for confining a dog alongside said bicycle as said bicycle is ridden by a rider.
15. The guard assembly of claim 14, wherein said plurality of said guide bars extend generally parallel to one another, rearwardly from said outer end of said lateral support member.
16. The guard assembly of claim 15, wherein said plurality of vertically spaced guide bars comprises:
    a first guide bar positioned so as to extend generally level and parallel to the upper body portion of a dog; and
    a second guide bar positioned so as to extend generally alongside the legs of a dog.
17. The guard assembly of claim 16, wherein said plurality of vertically spaced guide bars further comprises:
    a third guide bar positioned so as to extend generally alongside the head and back of a dog.
18. The guard assembly of claim 17, wherein said first guide bar is offset outwardly from said third and second guide bars so as to accommodate motion of the shoulders and hips of a dog when running.
19. The guard assembly of claim 18, wherein said third guide bar comprises:
    an upwardly curved portion for accommodating vertical motion of a shoulder of a dog and for presenting a visual reference to a dog when running within said enclosure.
20. The guard assembly of claim 14, wherein said plurality of vertically spaced guide bars further comprises:
    a first guide bar positioned so as to extend generally alongside the head and back of a dog; and
    a second guide bar positioned so as to extend generally alongside of a dog at a height below said first guide bar.
21. The guard assembly of claim 20, wherein said first guide bar comprises:
    an upwardly curved portion for accommodating vertical motion of a shoulder of a dog and for presenting a visual reference to a dog when running within said enclosure.

* * * * *